(12) United States Patent
Bayliss

(10) Patent No.: US 9,990,254 B1
(45) Date of Patent: Jun. 5, 2018

(54) TECHNIQUES FOR DATA RESTORATION

(75) Inventor: Michael John Bayliss, Oostakker (BE)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 471 days.

(21) Appl. No.: 12/362,303

(22) Filed: Jan. 29, 2009

(51) Int. Cl.
*G06F 11/14* (2006.01)

(52) U.S. Cl.
CPC ............. *G06F 11/1469* (2013.01)

(58) Field of Classification Search
CPC ............ G06F 2201/84; G06F 11/7093
USPC ....................... 726/23, 24; 713/2
See application file for complete search history.

(56) References Cited

U.S. PATENT DOCUMENTS

| | | | |
|---|---|---|---|
| 5,870,762 A * | 2/1999 | Lee | |
| 6,374,266 B1 * | 4/2002 | Shnelvar | |
| 6,950,836 B2 * | 9/2005 | Lohn et al. | |
| 7,260,746 B2 * | 8/2007 | Demsky et al. | 714/38.12 |
| 7,478,431 B1 * | 1/2009 | Nachenberg | 726/24 |
| 7,610,387 B1 * | 10/2009 | Liskov | H04L 29/12066 340/852 |
| 7,761,678 B1 * | 7/2010 | Bodmer et al. | 711/165 |
| 7,827,146 B1 * | 11/2010 | De Landstheer et al. | 707/651 |
| 7,966,293 B1 * | 6/2011 | Owara | G06F 11/1448 707/654 |
| 8,015,158 B1 * | 9/2011 | Mankovsky | G06F 11/1435 707/648 |
| 8,224,789 B1 * | 7/2012 | Caklovic | G06F 11/1469 707/674 |
| 8,370,594 B2 * | 2/2013 | Niles et al. | 711/162 |
| 8,495,037 B1 * | 7/2013 | Westenberg | 707/698 |
| 8,712,966 B1 * | 4/2014 | Armorer et al. | 707/645 |
| 2001/0034737 A1 * | 10/2001 | Cane | G06F 11/1451 |
| 2002/0138744 A1 * | 9/2002 | Schleicher et al. | 713/187 |
| 2003/0101167 A1 * | 5/2003 | Berstis | 707/3 |
| 2003/0233455 A1 * | 12/2003 | Leber | G02F 1/1339 709/226 |
| 2004/0143713 A1 * | 7/2004 | Niles et al. | 711/162 |
| 2005/0246612 A1 * | 11/2005 | Leis et al. | 714/763 |
| 2006/0010174 A1 * | 1/2006 | Nguyen | G06F 11/1458 |
| 2006/0149997 A1 * | 7/2006 | Chai | G06F 11/1469 714/6.3 |
| 2007/0136381 A1 * | 6/2007 | Cannon | G06F 11/1451 |
| 2007/0150948 A1 * | 6/2007 | De Spiegeleer | 726/22 |
| 2007/0179993 A1 * | 8/2007 | Arruza | G06F 11/1612 |
| 2007/0283158 A1 * | 12/2007 | Danseglio | 713/180 |
| 2008/0168108 A1 * | 7/2008 | Molaro | G06F 11/1435 |

(Continued)

OTHER PUBLICATIONS

Wispelaere, "Secure Optimized data protection for remote offices", Mar. 7, 2006, Symantec, p. 1-20.*

(Continued)

*Primary Examiner* — Taelor Kim
(74) *Attorney, Agent, or Firm* — Patent Law Works LLP

(57) ABSTRACT

Techniques for data restoration are disclosed. In one particular exemplary embodiment, the techniques may be realized as an apparatus for data restoration. The apparatus may comprise a module to identify a missing or corrupt file. The apparatus may also comprise a module to determine a file fingerprint of the missing or corrupt file from one or more associated databases and a module to determine if one or more clients has a copy of the missing or corrupt file. The apparatus may further comprise a module to request the missing or corrupt file from one or more of the one or more clients.

18 Claims, 4 Drawing Sheets

(56) References Cited

U.S. PATENT DOCUMENTS

| | | | |
|---|---|---|---|
| 2009/0125577 A1* | 5/2009 | Kodama | G06F 11/1458 709/201 |
| 2009/0126003 A1* | 5/2009 | Touboul | H04L 29/1233 726/13 |
| 2010/0031361 A1* | 2/2010 | Shukla | 726/24 |
| 2012/0023070 A1* | 1/2012 | Prahlad et al. | 707/652 |

OTHER PUBLICATIONS

Unknown, EMC Avamar Data Sheet, EMC2—Where Information Lives, Retrieved from the Internet at: http://www/emc.com/collateral/software/data-sheet/h2568_emc_avamar_ds_ldv.pdf, Copyright © 2007.

* cited by examiner

| Client | Filename | File Fingerprint | File location |
|---|---|---|---|
| $Client_1$ | A.dat | 13326 | C:\dat |
| $Client_1$ | B.dat | 12781 | C:\files |
| $Client_2$ | A.dat | 13326 | C:\dat |
| $Client_2$ | B.dat | 18651 | C:\files |
| $Client_2$ | C.dat | 17651 | C:\files |
| $Client_3$ | A.dat | 13326 | C:\dat |
| $Client_3$ | B.dat | 12781 | C:\dat |
| $Client_3$ | D.dat | 13579 | C:\files |
| $Client_3$ | E.dat | 13481 | C:\files |

Figure 2

Metabase:

| Client | Filename | File Fingerprint | File location (Client) |
|---|---|---|---|
| $Client_1$ | A.dat | 13326 | C:\dat |
| $Client_1$ | B.dat | 12781 | C:\files |
| $Client_2$ | A.dat | 13326 | C:\dat |
| $Client_2$ | B.dat | 18651 | C:\files |
| $Client_2$ | C.dat | 17651 | C:\files |
| $Client_3$ | A.dat | 13326 | C:\dat |
| $Client_3$ | B.dat | 12781 | C:\dat |
| $Client_3$ | D.dat | 13579 | C:\files |
| $Client_3$ | E.dat | 13481 | C:\files |

Content Database:

| Filename | File Fingerprint | File Location (Backup Storage) |
|---|---|---|
| A.dat | 13326 | E:\backup\client1 |
| B.dat | 12781 | E:\backup\client1 |
| B.dat | 18651 | E:\backup\client2 |
| C.dat | 17651 | E:\backup\client2 |
| D.dat | 13579 | E:\backup\client3 |
| E.dat | 13481 | E:\backup\client3 |

Figure 3

TECHNIQUES FOR DATA RESTORATION

FIELD OF THE DISCLOSURE

The present disclosure relates generally to backup systems and, more particularly, to techniques for data restoration.

BACKGROUND OF THE DISCLOSURE

Existing client-based backup systems make copies of files from one or more client computers and store the files in backup storage. If a client requests a stored file from backup storage in a backup system, perhaps because the client's original file was changed or corrupted, the backup system may search the backup storage for the requested file and present the requested file to the requesting client.

As the number of files increases, the likelihood that file corruption will occur in backup system storage increases. Problems such as hard drive malfunction or failure, accidental deletion, or filesystem corruption may cause file corruption in backup system storage. If a backup system or an administrator thereof notices such corruption, the administrator may need to manually request a new copy of a file from a client. In doing so, the administrator may need to manually look up file information to determine which client may happen to have the file. As the number of clients grows, both the problems of file corruption and the problems of finding and replacing corrupted files also grow. One solution to these problems may be to make one or more copies of backup system storage. However, it is inefficient to make one or more copies of backup system storage. Moreover, making copies of backup system storage may simply propagate a corrupt file. It is also inefficient to manually look up file information to find one or more clients that may have a copy of a corrupted file.

In view of the foregoing, it may be understood that there may be significant problems and shortcomings associated with current data backup and restoration technologies.

SUMMARY OF THE DISCLOSURE

Techniques for data restoration are disclosed. In one particular exemplary embodiment, the techniques may be realized as an apparatus for data restoration. The apparatus may comprise a module to identify a missing or corrupt file. The apparatus may also comprise a module to determine a file fingerprint of the missing or corrupt file from one or more associated databases and a module to determine if one or more clients has a copy of the missing or corrupt file. The apparatus may further comprise a module to request the missing or corrupt file from one or more of the one or more clients.

In accordance with other aspects of this particular exemplary embodiment, the apparatus may further comprise a module to receive the missing or corrupt file from one of the clients.

In accordance with further aspects of this particular exemplary embodiment, the databases may comprise a metabase and a content database.

In accordance with additional aspects of this particular exemplary embodiment, the metabase may store information associated with files associated with the one or more clients.

In accordance with other aspects of this particular exemplary embodiment, the content database may store files associated with the one or more clients.

In accordance with further aspects of this particular exemplary embodiment, files associated with the one or more clients may be stored separately from the content database.

In accordance with other aspects of this particular exemplary embodiment, the file fingerprint may be generated from the MD5 hash function.

In accordance with further aspects of this particular exemplary embodiment, the file fingerprint may be generated from a hash function in the SHA-2 family.

In another particular exemplary embodiment, the techniques may be realized as a method for data restoration. The method may comprise identifying a missing or corrupt file, determining a file fingerprint of the missing or corrupt file from one or more associated databases, and determining if one or more clients has a copy of the missing or corrupt file. The method may also comprise requesting the missing or corrupt file from one or more of the one or more clients.

In accordance with other aspects of this particular exemplary embodiment, the method may further comprise receiving the missing or corrupt file from one of the clients.

In accordance with further aspects of this particular exemplary embodiment, the requesting step of the method may occur independently of a regularly scheduled backup routine.

In accordance with additional aspects of this particular exemplary embodiment, the requesting step of the method may occur during a regularly scheduled backup routine.

In accordance with other aspects of this particular exemplary embodiment, the databases may comprise a metabase and a content database.

In accordance with further aspects of this particular exemplary embodiment, the metabase may store information associated with files associated with the one or more clients.

In accordance with additional aspects of this particular exemplary embodiment, the content database may store files associated with the one or more clients.

In accordance with other aspects of this particular exemplary embodiment, files associated with the one or more clients may be stored separately from the content database.

In accordance with other aspects of this particular exemplary embodiment, the file fingerprint may be generated from the MD5 hash function.

In accordance with further aspects of this particular exemplary embodiment, the file fingerprint may be generated from a hash function in the SHA-2 family.

In accordance with further aspects of this particular exemplary embodiment, at least one processor readable medium for storing a computer program of instructions configured to be readable by at least one processor for instructing the at least one processor to execute a computer process for performing the method may be provided.

In another particular exemplary embodiment, the techniques may be realized as an article of manufacture for data restoration. The article of manufacture may comprise at least one processor readable medium and instructions carried on the at least one medium, wherein the instructions may be configured to be readable from the at least one medium by at least one processor and thereby cause the at least one processor to operate. The at least one processor may identify a missing or corrupt file, determine a file fingerprint of the missing or corrupt file from one or more associated databases, determine if one or more clients has a copy of the missing or corrupt file, and request the missing or corrupt file from one or more of the one or more clients.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 2 shows exemplary data contained within exemplary client systems in accordance with an embodiment of the present disclosure.

FIG. 3 shows exemplary data in a metabase and a content database in accordance with an embodiment of the present disclosure.

DETAILED DESCRIPTION OF EXEMPLARY EMBODIMENTS

Figure 1:
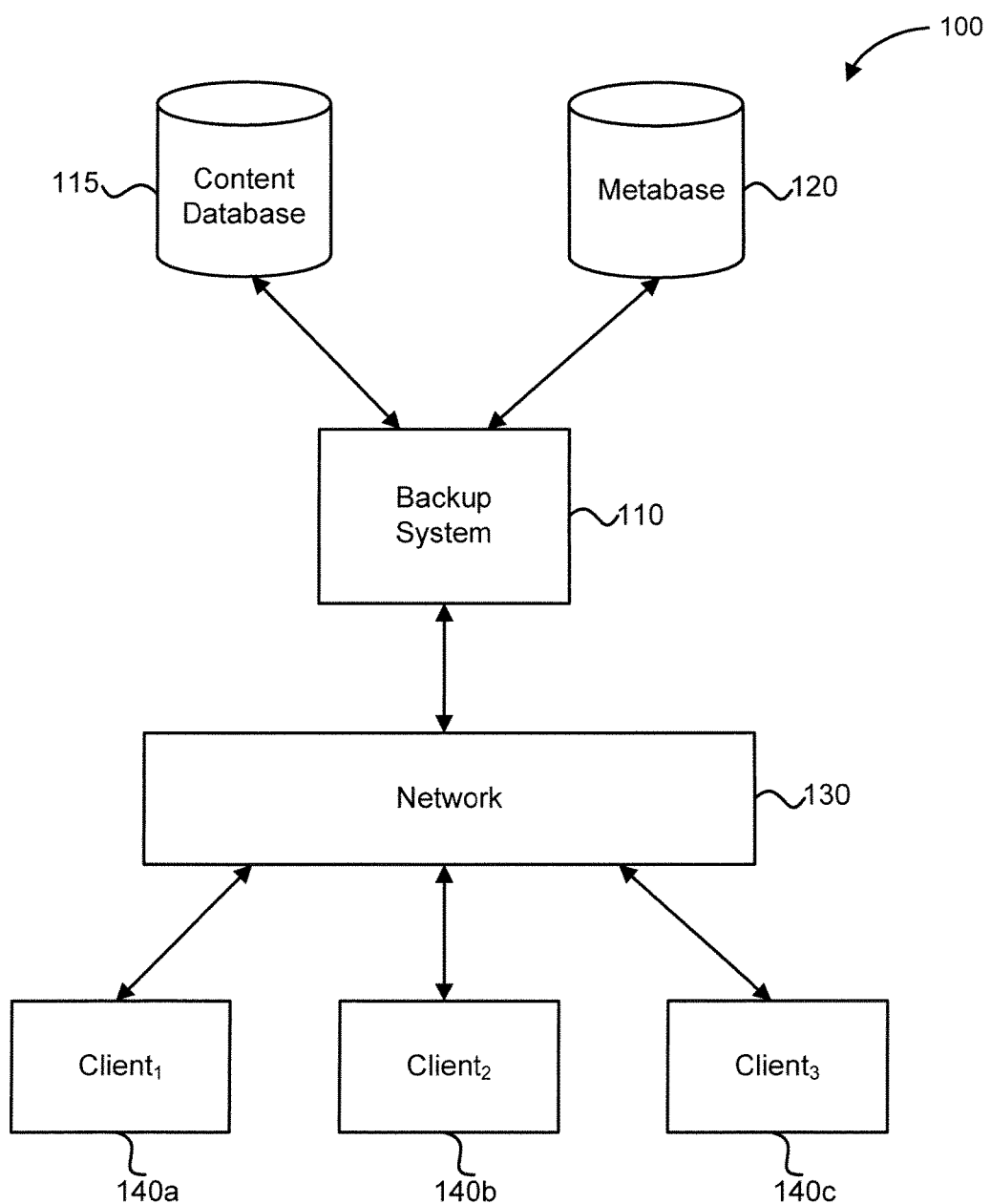
FIG. 1 shows a network diagram of a backup and restoration system in accordance with an embodiment of the present disclosure.

Referring to FIG. 1, there is shown a network diagram of a backup and restoration system 100 in accordance with an embodiment of the present disclosure. The system 100 comprises a backup system 110, a metabase 120, a content database 115, a network 130, and one or more clients, shown as client1 140a, client2 140b, and client3 140c.

The backup system 110 interfaces with one or more databases, as described below, and may interface with one or more client systems in order to save and organize files associated with the one or more client systems, so that the files may be recalled and/or restored if necessary. The backup system 110 may be implemented as hardware, or may be implemented as software executed on hardware. The backup system 110 may be a physical device commonly known in the art. For example, the backup system 110 may be implemented as a server. The backup system 110 may receive data from one or more inputs, produce data through one or more outputs, have or interface with one or more persistent storage devices for storing and retrieving data, and be in communication with one or more networks. The backup system 110 may operate using an operating system, and may load the operating system into memory in local persistent storage, for example, a hard drive, or may load the operating system into memory in shared storage across one or more networks. The backup system 110 may schedule one or more clients for backup on a repeating basis using a backup schedule. The backup system 110 may also manually select one or more clients for backup.

The content database 115 may be a database operable to store files copied from one or more clients via the backup system 110. The content database 115 may store the files as entries in the database, or the content database 115 may comprise a database with pathnames and/or pointers to the files, so that the files may exist separately from the database, in, for example, a filesystem or a separate system for storing files. The content database 115 may be implemented as hardware, or may be implemented as software executed on hardware. The content database 115 may be a physical device commonly known in the art. For example, the content database 115 may be implemented as one or more servers and/or one or more appliances. The content database 115 may receive data from one or more inputs, produce data through one or more outputs, have or interface with one or more persistent storage devices for storing and retrieving data, and be in communication with one or more networks. The content database 115 may operate using an operating system, and may load the operating system into memory in local persistent storage, for example, a hard drive, or may load the operating system into memory in shared storage across one or more networks. The content database 115 may access one or more storage devices. The storage devices may be, for example and without limitation, magnetic disk drives, optical disk drives, random access memory ("RAM") devices, flash memory, or any other type of media to store and recall data. The content database 115 may be implemented as a database or any other kind of file data structure that may allow access to data. For example, the content database 115 may be implemented as a relational database or may be implemented as a flat file or other filesystem structure.

The metabase 120 may be a database operable to store a list of clients and files that are associated with the clients, as information regarding the files associated with the clients is received via the backup system 110 from the clients. The metabase 120 may include a list of each file associated with each client in the list of clients, or may include a list of a smaller subset of files associated with the clients. For example, the metabase 120 may include only those files marked by the client or the backup system 110 to be backed-up, or the metabase 120 may include some or all files in one or more folders on a client computer marked for backup. The metabase 120 may store the files as entries in the database. The metabase 120 may be implemented as hardware, or may be implemented as software executed on hardware. The metabase 120 may be a physical device commonly known in the art. For example, the metabase 120 may be implemented as one or more servers and/or one or more appliances. The metabase 120 may receive data from one or more inputs, produce data through one or more outputs, have or interface with one or more persistent storage devices for storing and retrieving data, and be in communication with one or more networks. The metabase 120 may operate using an operating system, and may load the operating system into memory in local persistent storage, for example, a hard drive, or may load the operating system into memory in shared storage across one or more networks. The metabase 120 may access one or more storage devices. The storage devices may be, for example and without limitation, magnetic disk drives, optical disk drives, random access memory ("RAM") devices, flash memory, or any other type of media to store and recall data. The metabase 120 may be implemented as a database or any other kind of file data structure that may allow access to data. For example, the metabase 120 may be implemented as a relational database or may be implemented as a flat file or other filesystem structure.

The metabase 120 and the content database 115 may be implemented as databases residing on one logical server, or may be implemented as separate servers. Additionally, the metabase 120 and the content database 115 may access storage across one or more networks, so that the storage may be separate from hardware, or servers, used to execute software of the content database 115 and/or the metabase 120.

One or more clients (depicted in FIG. 1 as client1 140*a*, client2 140*b*, and client3 140*c*) may be physical devices commonly known in the art. For example, any of client1 140*a*, client2 140*b*, and client3 140*c* may be a computer that is implemented as one or more servers. Also, any of client1 140*a*, client2 140*b*, and client3 140*c* may be a computer that may receive data from one or more inputs, produce data through one or more outputs, have or interface with one or more persistent storage devices for storing and retrieving data, and/or be in communication with one or more networks. Further, any of client1 140*a*, client2 140*b*, and client3 140*c* may be a computer that may operate using an operating system, and may load the operating system into memory in local persistent storage, for example, a hard drive, or may load the operating system into memory in shared storage across one or more networks. Any of client1 140*a*, client2 140*b*, and client3 140*c* may also be, as further example and without limitation, a computer device such as a desktop computer, a laptop computer, a thin client computer, a personal digital assistant ("PDA"), or a cellular telephone with data storage capabilities. Any of client1 140*a*, client2 140*b*, and client3 140*c* may be architecturally different. For example, client1 140*a*, client2 140*b* and client3 140*c* may use different software, for example different operating systems or different application software, and may also have different filesystems. Any of client1 140*a*, client2 140*b*, and client3 140*c* may be in communication with a network 130, or may not be in communication with the network 130, and instead a user may manually copy data to removable hardware that is taken to another client attached to the network 130 or the backup system 110. In FIG. 1, three clients are shown client1 140*a*, client2 140*b*, and client3 140*c*. It should be understood that FIG. 1 is exemplary only, and that any number of clients may be used.

The network 130 may comprise the one or more networks referenced above, wherein each such network may include, but is not limited to, for example, a wide area network (WAN), a local area network (LAN), a fiber channel network, an optical network, a SCSI network, a global network such as the Internet, a telephone network such as a public switch telephone network, a wireless communication network, a cellular network, an intranet, or the like, or any combination thereof. Also, each such network may be used so that components of the present disclosure may be in communication with one another. In exemplary embodiments of the present disclosure, the network 130 may include one or any number of the exemplary types of networks mentioned above operating as a stand-alone network or in cooperation with each other. Use of the term network 130 herein is not intended to limit the network 130 to a single network.

In a backup operation of a new client (i.e., a client that has not been previously backed-up by the backup system 110), the client (e.g., client1 140*a*, client2 140*b*, or client3 140*c*) may send a list of all of the files associated with the client. In other embodiments, the client may send a list of files specifically marked for backup, or the client may send a list of files associated with one or more directories marked for backup. The client may also send a file fingerprint associated with each file, or the backup system 110 may create such a file fingerprint for each file from information provided by the client. For each file associated with the information provided by the client, the backup system 110 may make an entry in the metabase 120 including the name of the client, the filename, the file fingerprint, and the file location associated with the client. The backup system 110 may then query the content database 115 to see if a file with the same file fingerprint resides in the content database 115. If a file with the same file fingerprint resides in the content database 115, the backup system 110 may not request the file from the client. If no file with the same file fingerprint resides in the content database 115, the backup system 110 may request that the client send a copy of the file, and may store the copy of the file and the file fingerprint, along with the file's location, in the content database 115 or associated storage. In other embodiments, the content database 115 may also store the filename of the file.

Turning now to FIG. 2, there is shown exemplary data associated with exemplary clients in accordance with an embodiment of the present disclosure. Exemplary data is shown for the purpose of creating an operation example. More or less files may be associated with each of the clients. The files are identified by four fields. The first field (client) identifies which client is associated with the file. The second field (filename) identifies the filename. The third field (file fingerprint) identifies the file fingerprint. The fourth field (file location) identifies the file's location in the filesystem of the client.

The file fingerprint is a unique or semi-unique identifier of the file. For example, the file fingerprint may be an MD5 hash function with a CRC32 check for hash function collisions, or a SHA hash function, for example a SHA-2 family hash function, or may be another hash function applied to the file in question. The file fingerprint is intended to identify the file so that, if two files have the same file fingerprint, it can be determined with high confidence that the two files are identical. The file fingerprint may change if the file changes. The file fingerprint may be combined with another unique or semi-unique identifier that changes if the file changes. For example, the file size may be used as an additional identifier, as a change in the file size may indicate that a change has been made to the file, or a change in the file size without a corresponding notation that the file was changed may indicate that the file has been corrupted. Other metadata describing the file may also be used. Methods of generating unique file fingerprints or file identifiers are well known in the art. The individual clients may create the file fingerprints for each of the files associated with the client, or the backup system 110 or other system may generate the file fingerprints for the files based on information provided to the backup system 110 or other system by the individual client.

As shown in FIG. 2, client1 140*a* contains two files. A.dat has a file fingerprint of "13326" and a file location of "C:\dat." B.dat has a file fingerprint of "12781" and a file location of "C:\files."

Client2 140*b* contains three files. A.dat has a file fingerprint of "13326" and a file location of "C:\dat." B.dat has a file fingerprint of "18651" and a file location of "C:\files." C.dat has a file fingerprint of "17651" and a file location of "C:\files."

Client3 140*c* contains four files. A.dat has a file fingerprint of "13326" and a file location of "C:\dat." B.dat has a file fingerprint of "12781" and a file location of "C:\dat." D.dat has a file fingerprint of "13579" and a file location of "C:\files." E.dat has a file fingerprint of "13481" and a file location of "C:\files."

Turning now to FIG. 3, there is shown exemplary data in a metabase 120 and a content database 115 in accordance with an embodiment of the present disclosure.

The metabase 120 may include an entry for each file for each client. Data entries in the metabase 120 may include a client name for each of the files, a filename for each of the files, a file fingerprint for each of the files, and a file location on the client for each of the files. As described above, the metabase 120 may include an entry for each file for each client, or may include a subset of the files associated with the client. In the example provided in FIG. 3, each file for each client has an entry in the metabase 120. So, for example, the two entries corresponding to client1 140a correspond to the files contained on client1 140a referenced in FIG. 2.

Data entries in the content database 115 may include a file fingerprint for each of the files and a file location in the content database 115 for each of the files. In other embodiments, and shown in FIG. 3 for illustrative purposes, a filename for each of the files may also be stored. The files themselves may be stored separately in another storage area associated with the content database 115, or may reside on a different server or a different storage area in communication with the content database 115 and/or the backup system 110. In another embodiment, some or all of the files may be stored as entries within the content database 115. In the exemplary entries associated with the content database 115 in FIG. 3, there are fewer entries than there are entries in the metabase 120. Where files are identical, or have the same file fingerprint, only one copy of the file may be stored in the content database 115. Restoration of the files associated with each of the clients thus uses the entries in the metabase 120, to determine which client has a file, and the content database 115, to retrieve the files associated with the clients. The file fingerprint may be the field common to both the metabase 120 and the content database 115. The filename may not be the common field, as a filename may exist twice in the content database 115, as is the case for the file B.dat.

A daemon associated with the backup system 110 and/or the content database 115 may monitor the files for signs of corruption and/or accidental deletion. The daemon may continually monitor the files, or the monitoring may occur on a schedule or manually. The daemon may compare a hash function of the files in the content database 115 against the file fingerprints stored in the metabase 120 and/or the content database 115. If the hash of the file does not match the file fingerprint, the daemon may conclude that the file has been altered and is therefore corrupt. The daemon may monitor other attributes as well. For example, the daemon may compare the file in the content database 115 to a backup of the file stored in another archive, and may account for the possibility that the file in the other archive may be corrupt or missing as well. Or, the daemon may use an application associated with the file to open the file. If the file does not or cannot open in the application, the daemon may determine that the file is corrupted.

If a file is corrupted or missing, as determined by the daemon, the daemon may add that file, based for example on the file fingerprint, to a list of corrupted or missing files. The backup system 110 may review the list and determine, using the file fingerprint and the metabase 120, which clients are associated with the file. For example, if file A.dat with file fingerprint "13326" in the content database 115 was deemed to be corrupted, the backup system 110 would query the metabase 120 for the file fingerprint "13326" and determine that client1 140a, client2 140b, and client3 140c each had a file with file fingerprint "13326." The backup system 110 may take the list of clients associated with the corrupt file, and may determine which client is next due for backup on the backup schedule. If client2 140b is due to be backed up next, the backup system 110 may, at the time client2 140b is backed up, request file A.dat from client2 140b. If client2 140b has a copy of A.dat, and the file fingerprint matches the file fingerprint in the metabase 120 and/or the content database 115 for file A.dat, then the backup system 110 may store file A.dat in the content database 115 as a replacement for the corrupted file. The backup system 110 may note that the file was corrupted and replaced in a log file or in the metabase 120 and/or content database 115.

The functionality of the backup system may be implemented as, for example, a series of interoperable modules, so that a module operating as the daemon above, a module to request files or deliver files to the clients, a module to attempt to fix a corrupt file, and a module to determine the file fingerprints and determine if a client may have a copy of the corrupt file may be provided. In another embodiment, the functionality described may be implemented in hardware or as a single software process, instead as interoperable modules.

Figure 4:
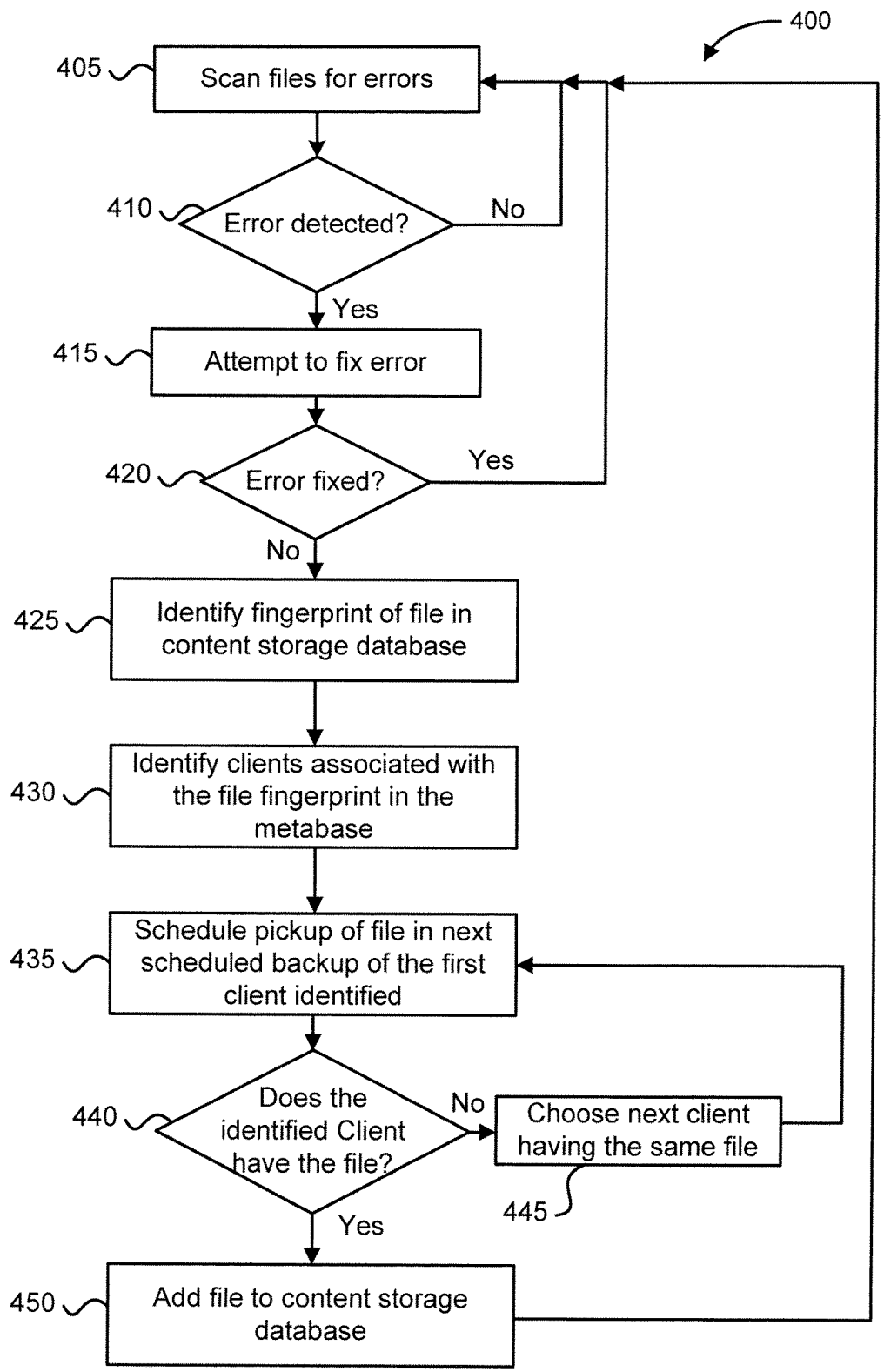
FIG. 4 shows a flow chart depicting a method in accordance with an embodiment of the present disclosure.

Turning now to FIG. 4, there is shown a flow chart depicting a method 400 in accordance with an embodiment of the present disclosure. In step 405, the backup system 110 may scan the content database 115 for errors. The errors may include, for example and without limitation, missing files, corrupted files, or changed files. The backup system 110 may maintain a database of file fingerprints for some or all of the files in the content database 115. For example, the backup system 110 may maintain a database of MD5, SHA-2, or other hash function values for one or more of the files in the content database 115, or may maintain a database of values related to other methods of creating a unique or semi-unique fingerprint of one or more of the files in the content database 115.

In step 410, if an error is not detected, the backup system 110 may continue to scan one or more of the one or more files in the content database 115, returning to step 405. The backup system 110 may scan files with similar frequency (i.e., may scan each of the files once, and then repeat), or may scan files with different frequencies (i.e., may scan some files more or less frequently than other files). The frequency may be determined by the resources available to the backup process, or may use a smaller amount than the total available resources. The frequency may be set and/or adjusted by an administrator, or may be set by the backup system 110.

If, in step 410, the backup system 110 detects an error or missing file, the backup system 110 may advance to step 415. In step 415, the backup system 110 may attempt to fix the error. The backup system 110 may attempt to fix the error by, for example and without limitation, restoring the file from a previously taken backup of the content database 115, or performing one or more operations (e.g., an algorithm to fix portions of a corrupted file) on the file to attempt to fix the error.

In step 420, if the error is fixed, the backup system 110 may scan other files, returning to step 405. If the error is not fixed, or the backup system 110 cannot fix the error, in step 425, the backup system 110 may communicate with the content database 115 to determine the file fingerprint of the file. The file fingerprint of the file may be a unique or semi-unique value associated with the file.

In step 430, using the file fingerprint found in the content database 115 of the file that is corrupted or missing, the backup system 110 communicates with the metabase 120 to determine which clients may have files with the same file fingerprint as the corrupted or missing file. The metabase 120 may return all of the clients that may have files with the same file fingerprint as the corrupted or missing file in the content database 115, or may return one or more of the clients. The backup system 110 may receive the list of clients.

In step 435, the backup system 110 may add a request for the missing or corrupted file to the backup schedule. A client may transmit the list of files it currently has to the backup system 110, and the backup system 110 may match the file fingerprints of the files from the client against the file fingerprint of the missing or corrupted file. If the backup system 110 notes that the file fingerprint of a file with the client matches the file fingerprint of the missing or corrupted file, the backup system 110 may instruct the client to transmit the file. In another embodiment, the backup system 110 may specifically request that the client send the corrupted file to the backup system 110.

In step 440, the client may either have the file with the same file fingerprint as the missing or corrupted file, or it may not have the file.

In step 445, if the client does not have the file, then the backup system 110 may request the file from the next client on the list transmitted from the metabase 120 in step 430. In another embodiment, the backup system 110 may request the same missing or corrupted file from two or more of the clients with a file matching the file fingerprint of the missing or corrupted file.

In step 450, if the client transmits the requested file to the backup system 110, the backup system 110 may receive the file and may store it in the content database 115. The backup system 110 may replace the corrupt file in the content database 115 with the uncorrupt file received from the client, or may retain the corrupted file in the content database 115. If a client later requests the file from the backup system 110, the backup system 110 may transmit the uncorrupted file from the content database 115 to the client. The backup system 110 may then return to scanning files for errors in step 405, or may continue to scan files for errors while the other steps in method 400 are implemented.

If the file is not found associated with any of the clients, the backup system 110 may mark the file as corrupted, and may leave the corrupted file in the content database 115. In another embodiment, the backup system 110 may mark the file as corrupted and remove the file from the content database 115.

At this point it should be noted that data restoration systems in accordance with the present disclosure as described above typically involves the processing of input data and the generation of output data to some extent. This input data processing and output data generation may be implemented in hardware or software. For example, specific electronic components may be employed in a computer server or similar or related circuitry for implementing the functions associated with data restoration in accordance with the present disclosure as described above. Alternatively, one or more processors operating in accordance with instructions may implement the functions associated with data restoration in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for data restoration comprising:
   one or more hardware computer processors communicatively coupled to a network,
      wherein the one or more processors are configured to:
      detect errors in a content database;
      execute a repair operation in response to the detected errors, wherein the repair operation comprises fixing any errors detected in the content database using at least one initial fix operation;
      in the event the detected errors cannot be fixed using the at least one initial fix operation, identify a missing or corrupt file;
      determine a file fingerprint of the missing or corrupt file from at least one of a metabase and the content database, wherein the file fingerprint and at least one unique identifier are configured to indicate changes in a file in the event the file changes;
      determine if a plurality of clients of a set of clients has a copy of the missing or corrupt file by comparing the file fingerprint of the missing or corrupt file to the file fingerprint data stored in the metabase, wherein files associated with the one or more clients are stored separately from the content database, and wherein the copy of the missing or corrupt file is used for data restoration; and
      request the copy of the missing or corrupt file from one or more of the plurality of clients by:
         adding a request for the missing or corrupt file to a backup schedule of the plurality of clients in which the plurality of clients are each backed up at different successive times in a backup schedule; and
         requesting the missing or corrupt file from each successive client on the backup schedule until a copy of the missing or corrupt file is located;
         wherein the one or more clients of the plurality of clients are each computers having a filesystem.

2. The system of claim 1, wherein the one or more processors are further configured to receive the missing or corrupt file from one of the clients.

3. The system of claim 1, wherein the metabase stores information associated with files associated with the one or more clients.

4. The system of claim 1, wherein the content database stores files associated with the one or more clients.

5. The system of claim 1, wherein the file fingerprint is generated from the MD5 hash function.

6. The system of claim 1, wherein the file fingerprint is generated from a hash function in the SHA-2 family.

7. The system of claim 1, wherein the second file location data indicates a location of a file in backup storage.

8. A method for data restoration comprising the steps of:
   detecting errors in a content database;

executing a repair operation in response to the detected errors, wherein the repair operation comprises fixing any errors detected in the content database using at least one initial fix operation;

in the event the detected errors cannot be fixed using the at least one initial fix operation, identifying a missing or corrupt file;

determining a file fingerprint of the missing or corrupt file from at least one of a metabase and the content database, wherein the file fingerprint and at least one unique identifier are configured to indicate changes in a file in the event the file changes;

determining if a plurality of claims of a set of clients has a copy of the missing or corrupt file by comparing the file fingerprint of the missing or corrupt file to the file fingerprint data stored in the metabase, wherein files associated with the one or more clients are stored separately from the content database and wherein the copy of the missing or corrupt file is used for data restoration; and requesting the copy of the missing or corrupt file from one or more of the plurality of clients by:
  adding a request for the missing or corrupt file to a backup schedule of the plurality of clients in which the plurality of clients are each backed up at different successive times in a backup schedule; and
  requesting the missing or corrupt file from each successive client on the backup schedule until a copy of the missing or corrupt file is located;
  wherein the one or more clients of the plurality of clients are each computers having a filesystem.

9. The method of claim 8, further comprising receiving the missing or corrupt file from one of the clients.

10. The method of claim 8, wherein the requesting step occurs independently of a regularly scheduled backup routine.

11. The method of claim 8, wherein the requesting step occurs during a regularly scheduled backup routine.

12. The method of claim 8, wherein the metabase stores information associated with files associated with the one or more clients.

13. The method of claim 8, wherein the content database stores files associated with the one or more clients.

14. The method of claim 8, wherein the file fingerprint is generated from the MD5 hash function.

15. The method of claim 8, wherein the file fingerprint is generated from a hash function in the SHA-2 family.

16. At least one non-transitory processor readable medium for storing a computer program of instructions configured to be readable by at least one processor for instructing the at least one processor to execute a computer process for performing the method as recited in claim 8.

17. The method of claim 8, wherein the second file location data indicates a location of a file in backup storage.

18. An article of manufacture for data restoration, the article of manufacture comprising:
  at least one non-transitory processor readable medium; and
  instructions carried on the at least one medium;
  wherein the instructions are configured to be readable from the at least one medium by at least one processor and thereby cause the at least one processor to operate so as to:
  detect errors in a content database;
  execute a repair operation in response to the detected errors, wherein the repair operation comprises fixing any errors detected in the content database using at least one initial fix operation;
  in the event the detected errors cannot be fixed using the at least one initial fix operation, identify a missing or corrupt file;
  determine a file fingerprint of the missing or corrupt file from at least one of a metabase and the content database, wherein the file fingerprint and at least one unique identifier are configured to indicate changes in a file in the event the file changes;
  determine if a plurality of clients of a set of clients has a copy of the missing or corrupt file by comparing the file fingerprint of the missing or corrupt file to the file fingerprint data stored in the metabase, wherein files associated with the one or more clients are stored separately from the content database and wherein the copy of the missing or corrupt file is used for data restoration; and
  request the copy of the missing or corrupt file from one or more of the plurality of clients by:
    adding a request for the missing or corrupt file to a backup schedule of the plurality of clients in which the plurality of clients are each backed up at different successive times in a backup schedule; and
    requesting the missing or corrupt file from each successive client on the backup schedule until a copy of the missing or corrupt file is located;
    wherein the one or more clients of the plurality of clients are each computers having a filesystem.

* * * * *